United States Patent
Lee et al.

(10) Patent No.: US 11,490,022 B2
(45) Date of Patent: Nov. 1, 2022

(54) AR GLASS APPARATUS AND OPERATING METHOD THEREOF

(71) Applicant: SAMSUNG ELECTRONICS CO., LTD., Suwon-si (KR)

(72) Inventors: Wonwoo Lee, Suwon-si (KR); Bonkon Koo, Suwon-si (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 182 days.

(21) Appl. No.: 16/940,662

(22) Filed: Jul. 28, 2020

(65) Prior Publication Data

US 2021/0051260 A1    Feb. 18, 2021

(30) Foreign Application Priority Data

Aug. 13, 2019  (KR) .......................... 10-2019-0098927

(51) Int. Cl.
*H04N 5/235*   (2006.01)
*G06F 3/01*   (2006.01)

(52) U.S. Cl.
CPC ........... *H04N 5/2351* (2013.01); *G06F 3/013* (2013.01); *H04N 5/2353* (2013.01)

(58) Field of Classification Search
CPC .............. H04N 5/2351; H04N 5/2353; H04N 5/23251; G06F 3/013
See application file for complete search history.

(56) References Cited

U.S. PATENT DOCUMENTS

| | | | | |
|---|---|---|---|---|
| 7,546,026 B2 * | 6/2009 | Pertsel | ................. | H04N 5/2327 396/153 |
| 7,995,116 B2 | 8/2011 | Pillman et al. | | |
| 8,159,544 B2 * | 4/2012 | Lin | ........................ | H04N 5/144 348/208.99 |
| 8,379,934 B2 * | 2/2013 | Jasinski | ............... | H04N 5/2327 348/229.1 |

(Continued)

FOREIGN PATENT DOCUMENTS

CN    106257917 A  *  12/2016  ........... H04N 5/2351

OTHER PUBLICATIONS

"The intuitive interface for Human-Computer Interaction in headsets", Eye Tracking-AdHawk Microsystems, Oct. 19, 2017, pp. 1-5, http://www.adhawkmicrosystems.com/eye-tracking.

(Continued)

*Primary Examiner* — John Villecco
(74) *Attorney, Agent, or Firm* — Sughrue Mion, PLLC

(57) ABSTRACT

An operating method of an AR glass apparatus includes obtaining a preview image through a camera of the apparatus, tracking a gaze direction of a user wearing the apparatus, determining an object of interest in the preview image based on the tracked gaze direction, obtaining local motion information indicating a movement of the object of interest by tracking the movement of the object of interest, measuring a movement of the apparatus, obtaining global motion information indicating a movement of a background region included in the preview image based on the measured movement of the apparatus, adjusting a degree of exposure based on the local motion information and the global motion information, and photographing a front of the apparatus through the camera having the adjusted degree of exposure.

20 Claims, 10 Drawing Sheets

(56) References Cited

U.S. PATENT DOCUMENTS

| | | | | |
|---|---|---|---|---|
| 8,611,595 | B2* | 12/2013 | Son | G06T 7/254 |
| | | | | 348/208.4 |
| 9,131,150 | B1 | 9/2015 | Mangiat et al. | |
| 9,648,229 | B2* | 5/2017 | Kinoshita | H04N 5/23219 |
| 10,213,105 | B2* | 2/2019 | Sarkar | A61B 3/113 |
| 10,514,755 | B2* | 12/2019 | Cho | G02B 27/0093 |
| 2009/0231449 | A1* | 9/2009 | Tzur | H04N 5/145 |
| | | | | 348/208.6 |
| 2011/0150284 | A1* | 6/2011 | Son | G06T 7/251 |
| | | | | 382/103 |
| 2012/0194419 | A1* | 8/2012 | Osterhout | G02B 27/017 |
| | | | | 345/156 |
| 2015/0016683 | A1* | 1/2015 | Kinoshita | H04N 5/23219 |
| | | | | 382/103 |
| 2016/0212355 | A1* | 7/2016 | Pouli | G06T 7/20 |
| 2018/0103194 | A1 | 4/2018 | Tang | |
| 2019/0221191 | A1* | 7/2019 | Chhipa | G09G 3/002 |

OTHER PUBLICATIONS

"What is eye-tracking?", Tobii Dynavox US, Jun. 15, 2016, pp. 1-4, https://www.tobiidynavox.com/en-us/about/about-us/how-eye-tracking-works/.

* cited by examiner (a) (b)

(a) (b)

AR GLASS APPARATUS AND OPERATING METHOD THEREOF

CROSS-REFERENCE TO RELATED APPLICATION

This application is based on and claims priority under 35 U.S.C. § 119 to Korean Patent Application No. 10-2019-0098927, filed on Aug. 13, 2019, in the Korean Intellectual Property Office, the disclosure of which is incorporated by reference herein in its entirety.

BACKGROUND

1. Field

The disclosure relates to an augmented reality (AR) glass apparatus and an operating method thereof, and more particularly, to an AR glass apparatus and an operating method thereof, in which a degree of exposure of a camera that captures an image may be adjusted based on information about an object of interest of a user and motion in a background region in a captured image, information about a movement of the AR glass apparatus, and information about a gaze direction of the user.

2. Description of Related Art

With the recent development of technologies, wearable devices in various forms, which are wearable on human bodies, have been released. Among them, an augmented reality (AR) glass apparatus is a wearable device worn on a user's head and provides an AR service to the user by providing visual information through a display.

AR glass apparatuses according to the related art may suffer from quality degradation such as motion blur caused by a user's intentional or unintentional movement when photographing is performed using a camera. Such image quality degradation may cause performance degradation of space mapping functions such as image-based object recognition and simultaneous localization and mapping (SLAM) when an AR glass apparatus is used, as well as image capturing.

SUMMARY

The disclosure provides an AR glass apparatus and an operating method thereof, in which a degree of exposure of a camera capturing an image is adjusted based on information about a movement of an object of interest of a user and a motion in a background region in a captured image, thereby preventing quality degradation of the image.

Objects of the disclosure are not limited to the objects described above, and other objects and advantages which are not mentioned above may be understood from the following description and may be clearly understood by an embodiment of the disclosure. In addition, it would be easily understood that the object and advantages of the disclosure may be implemented by means provided in the claims and a combination thereof.

Additional aspects will be set forth in part in the description which follows and, in part, will be apparent from the description, or may be learned by practice of the presented embodiments of the disclosure.

A first aspect of the disclosure provides an operating method of an augmented reality (AR) glass apparatus, the operating method including obtaining a preview image through a camera of the AR glass apparatus, tracking a gaze direction of a user wearing the AR glass apparatus, determining at least one object of interest in the preview image based on the tracked gaze direction, obtaining local motion information indicating a movement of the at least one object of interest by tracking the movement of the at least one object of interest, measuring a movement of the AR glass apparatus, obtaining global motion information indicating a movement of a background region included in the preview image based on the measured movement of the AR glass apparatus, adjusting a degree of exposure of the camera based on the local motion information and the global motion information, and photographing a front of the AR glass apparatus through the camera having the adjusted degree of exposure.

The operating method may further include measuring an illuminance around the AR glass apparatus by using an illuminance sensor of the AR glass apparatus, and adjusting the degree of exposure of the camera based on the measured illuminance.

The determining of the at least one object of interest may include determining the at least one object of interest in the captured preview image based on image analysis with respect to a region corresponding to the tracked gaze direction in the captured preview image.

The obtaining of the local motion information may include tracking a position change of the at least one object of interest in each frame of the preview image, and obtaining the local motion information based on a result of tracking the position change.

The obtaining of the global motion information may include determining the background region included in the captured preview image, tracking the movement of the background region based on a result of measuring the movement of the AR glass apparatus, and obtaining the global motion information based on a result of tracking the movement of the background region.

The measuring of the movement of the AR glass apparatus may include measuring at least one of a position, a direction, a speed, or an acceleration of the AR glass apparatus.

The adjusting of the degree of exposure of the camera may include adjusting at least one of an International Organization for Standardization (ISO) value, a shutter speed, or an aperture value of the camera.

The adjusting of the degree of exposure of the camera may include identifying an illuminance of the at least one object of interest in the captured preview image, determining a range of the shutter speed by comparing an illuminance around the AR glass apparatus measured through an illuminance sensor with the identified illuminance of the at least one object of interest, and determining a range of the ISO value based on the determined range of the shutter speed.

The adjusting of the degree of exposure of the camera may further include identifying a depth of the at least one object of interest in the captured preview image; and determining a range of the aperture value based on the determined depth.

The adjusting of the degree of exposure of the camera may further include generating a control command for adjusting at least one of the ISO value, the shutter speed, or the aperture value of the camera, based on the determined range of the shutter speed, the determined range of the ISO value, or the determined range of the aperture value.

A second aspect of the disclosure includes an AR glass apparatus Including a camera, a motion sensor, and at least one processor, in which the at least one processor is configured to obtain a preview image through the camera of the AR glass apparatus, track a gaze direction of a user wearing the AR glass apparatus, determine at least one object of interest in the preview image based on the tracked gaze direction, obtain local motion information indicating a movement of the at least one object of interest by the tracking movement of the at least one object of interest, measure a movement of the AR glass apparatus by using the motion sensor, obtain global motion information indicating a movement of a background region included in the preview image based on the measured movement of the AR glass apparatus, adjust a degree of exposure of the camera based on the local motion information and the global motion information, and photograph a front of the AR glass apparatus through the camera having the adjusted degree of exposure.

A third aspect of the disclosure provides a computer-readable recording medium having recorded thereon a program for executing operations on a computer, the operations including obtaining a preview image through a camera of the AR glass apparatus, tracking a gaze direction of a user wearing the AR glass apparatus, determining at least one object of interest in the preview image based on the tracked gaze direction, obtaining local motion information indicating a movement of the at least one object of interest by tracking the movement of the at least one object of interest, measuring a movement of the AR glass apparatus, obtaining global motion information indicating a movement of a background region included in the preview image based on the measured movement of the AR glass apparatus, adjusting a degree of exposure of the camera based on the local motion information and the global motion information, and photographing a front of the AR glass apparatus through the camera having the adjusted degree of exposure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
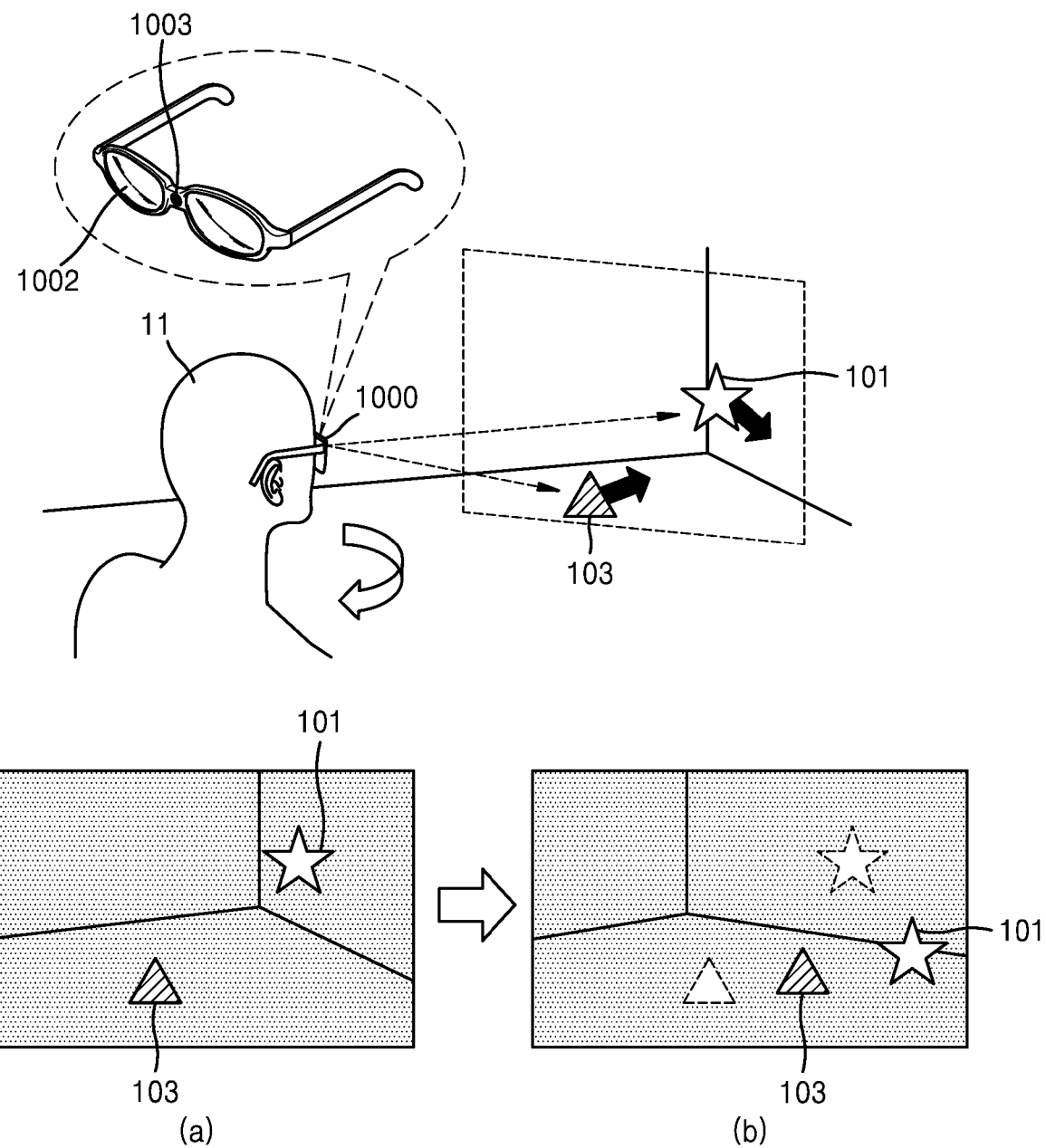
FIG. 1 illustrates a use environment of an augmented reality (AR) glass apparatus according to some embodiments of the disclosure.

The foregoing objects, features, and advantages will be described in detail with reference to the accompanying drawings, and thus the technical spirit of the disclosure may be easily carried out by those of ordinary skill in the art. A detailed description of related well-known techniques will be omitted when it unnecessarily obscures the subject matter of the disclosure. Hereinafter, embodiments of the disclosure will be described with reference to the accompanying drawings. In the drawings, like reference numerals refer to like or similar components.

Throughout the disclosure, the expression "at least one of a, b or c" indicates only a, only b, only c, both a and b, both a and c, both b and c, all of a, b, and c, or variations thereof.

FIG. 1 illustrates a use environment of an augmented reality (AR) glass apparatus according to some embodiments of the disclosure.

Referring to FIG. 1, an AR glass apparatus 1000 according to some embodiments of the disclosure may be worn on a head of a user 11 in the same manner as glasses.

The AR glass apparatus 1000 may deliver visual information to the user 11 wearing the AR glass apparatus 1000 through a display 1002. The AR glass apparatus 1000 may, for example, display a user interface for controlling the AR glass apparatus 1000, a user interface for displaying a state of the AR glass apparatus 1000, etc., through the display 1002.

The display 1002 of the AR glass apparatus 1000 may, for example, use at least one of a semi-reflective curved mirror scheme for which optical see-through is possible, alight guide scheme, or a waveguide scheme. The AR glass apparatus 1000 may deliver information about a cubic image through the display 1002 for which optical see-through is possible, thus providing the experience of AR to the user 11.

The AR glass apparatus 1000 may capture a preview image including at least one object located in front of the AR glass apparatus 1000 through a camera 1003. While it is illustrated in FIG. 1 that the camera 1003 of the AR glass apparatus 1000 is located in the center of a front surface of the AR glass apparatus 1000, the position of the camera 1003 is not limited thereto.

The AR glass apparatus 1000 may, for example, analyze a preview image captured through the camera 1003 to detect at least one object included in the image.

The camera 1003 may, for example, be a red/green/blue (RGB)-depth camera capable of obtaining an RGB image and depth information. The camera 1003 may, as another example, include an RGB obtaining module capable of obtaining the RGB image and a depth obtaining module capable of obtaining the depth information. The AR glass apparatus 1000 having obtained the RGB image and the depth information which are obtained through the camera 1003 may obtain a three-dimensional (3D) position of at least one object included in the image with respect to a camera coordinate system.

The AR glass apparatus 1000 may transform the obtained 3D position into a two-dimensional (2D) position on an image coordinate system.

It is a technique commonly used in an image processing field to detect an object included in an image using an RGB image and depth information which are obtained through a camera and obtain a 3D position of the detected object, such that a detailed description of the principles of image analysis using the RGB image and the depth information in the embodiment of the disclosure will be omitted.

Referring to (a) of FIG. 1, an image of an $(N-1)^{th}$ frame forming a preview image captured through the camera 1003 in the AR class apparatus 1000 according to some embodiments of the disclosure is illustrated. The preview image captured by the AR glass apparatus 1000 may, for example, include a first object 101 and a second object 103 located in front of the AR glass apparatus 1000.

The AR glass apparatus 1000 may track the direction of a gaze of the user 11. The user 11 may, for example, gaze at an object or region located in front of the AR glass apparatus 1000, while wearing the AR glass apparatus 1000. The AR glass apparatus 1000 may track the direction of the gaze of the user 11 gazing at the object or region.

The AR glass apparatus 1000 may, for example, determine that the user 11 gazes at the object or region, based on at least one of a duration for which the gaze of the user 11 is directed toward the object or region, the number of times that the gaze of the user 11 is directed toward the object or region, or a frequency at which the gaze of the user 11 is directed toward the object or region.

The AR glass apparatus 1000 may determine at least one object of interest in the preview image captured through the camera 1003, based on a result of tracking the gaze direction of the user 11.

The AR glass apparatus 1000 may, for example, identify at least one object at which the user 11 gazes, based on a result of tracking the gaze direction of the user 11.

The AR glass apparatus 1000 may, for example, perform image analysis with respect to a region corresponding to the gaze direction of the user 11 in the preview image captured through the camera 1003. The AR glass apparatus 1000 may determine at least one object of interest in the preview image captured through the camera 1003, based on a result of the image analysis.

That is, the AR glass apparatus 1000 may compare the preview image captured through the camera 1003 with the result of tracking the gaze direction of the user 11 to identify a position and a form of at least one object at which the user 11 gazes in the preview image.

The AR glass apparatus 1000 may determine at least one object of Interest in the preview image captured through the camera 1003, based on a result of identifying the at least one object at which the user 11 gazes.

When the AR glass apparatus 1000, for example, determines that the user 11 gazes at two or more objects within a preset time, the AR glass apparatus 1000 may determine two or more objects of interest in the preview image captured through the camera 1003, based on a result of identifying the two or more objects at which the user 11 gazes.

When the AR glass apparatus 1000, as another example, determines that the user 11 gazes at two or more objects a preset number of times or more, the AR glass apparatus 1000 may determine two or more objects of interest in the preview image captured through the camera 1003, based on a result of identifying the two or more objects at which the user 11 gazes.

Referring back to (a) of FIG. 1, the AR glass apparatus 1000 may, for example, determine the first object 101 and the second object 103 at which the user 11 gazes in the preview image as objects of interest, based on a result of tracking the gaze direction of the user 11.

The AR glass apparatus 1000 may obtain local motion information Indicating a movement of an object of interest by tracking a movement of the determined at least one object of interest.

In the disclosure, the local motion information may be information regarding position change of the object of interest between frames based on the movement of the object. That is, the local motion information may be information regarding the movement of the object of interest in the image over time.

The local motion information may, for example, include at least one of the number of objects of interest in the image, a moving direction, a moving speed, or a motion vector of each object of interest.

The AR glass apparatus 1000 may, for example, track the position change of the object of interest in each frame of the preview image and obtain the local motion information based on a result of tracking the position change.

Referring to (b) of FIG. 1, an image of an N frame forming a preview image captured through the camera 1003 in the AR class apparatus 1000 according to some embodiments of the disclosure is illustrated. The image of the $N^{th}$ frame may, for example, become different from the image of the $(N-1)^{th}$ frame, upon change of spatial positions of the first object 101 and the second object 103 determined as objects of interest simultaneously with rotation of the head of the user 11 wearing the AR glass apparatus 1000 in a certain direction.

Comparing the $(N-1)^{th}$ frame of (a) of FIG. 1 with the $N^{th}$ frame of (b) of FIG. 1, positions of the first object 101 and the second object 103 in the preview image change as the spatial positions of the first object 101 and the second object 103 determined as the objects of interest change.

Comparing the $(N-1)^{th}$ frame of (a) of FIG. 1 with the $N^{th}$ frame of (b) of FIG. 1, a position of a background Included in the preview image also changes as the head of the user 11 wearing the AR glass apparatus 1000 rotates in a certain direction.

The AR glass apparatus 1000 may, for example, track position changes of the first object 101 and the second object 103 in the $(N-1)^{th}$ frame and the N frame in the preview image captured through the camera 1003, and obtain local motion information indicating a movement of the first object 101 and the second object 103 based on a result of tracking the position changes.

The AR glass apparatus 1000 may measure a movement of the AR glass apparatus 1000 through a motion sensor. The AR glass apparatus 1000 may, for example, measure at least one of a position, a direction, a speed, or an acceleration of the AR glass apparatus 1000 through a motion sensor.

The AR glass apparatus 1000 may, for example, obtain global motion information indicating a movement of a background region included in the preview image captured through the camera 1003, based on the measured movement of the AR glass apparatus 1000.

In the disclosure, the global motion information may be information regarding a position change of a background region between frames based on a movement of the head of the user 11 wearing the AR glass apparatus 1000. That is, the global motion information may be information regarding motion of the background region in the image over time.

The AR glass apparatus 1000 may, for example, determine the background region included in the preview image captured through the camera 1003 to obtain the global motion information.

When the image captured through the camera 1003, for example, Includes the object of interest, the background region may be a region other than a region corresponding to the object of interest in the entire region of the captured image.

When the image captured through the camera 1003, as another example, does not include the object of interest, the background region may be the same region as the entire region of the captured image.

The global motion information may, for example, include at least one of a moving direction, a moving speed, or a motion vector of a background region of interest in an image.

The AR glass apparatus 1000 may, for example, track the movement of the background region based on a result of measuring the movement of the AR glass apparatus 1000. The AR glass apparatus 1000 may perform image analysis for the movement of the background region in the preview image captured through the camera 1003. The AR glass apparatus 1000 may obtain the global motion information based on a result of the image analysis for the movement of the background region and a result of measuring the movement of the AR glass apparatus 1000.

The AR glass apparatus 1000 may adjust a degree of exposure of the camera 1003 capturing the front of the AR glass apparatus 1000, based on at least one of the local motion information or the global motion information.

The AR glass apparatus 1000 may, for example, adjust the degree of exposure of the camera 1003 capturing the front of the AR glass apparatus 1000, based on the local motion information and the global motion information.

The AR glass apparatus 1000 may, for example, compensate for an influence of the movement of the AR glass apparatus 1000 upon the image, based on the obtained global motion Information. That is, the AR glass apparatus 1000 may perform correction on the local motion information indicating the movement of the object of interest based on the global motion information.

Based on the local motion information from which an influence of the movement of the AR glass apparatus 1000 is removed, the AR glass apparatus 1000 may determine an appropriate degree of exposure of the camera 1003 for clearly photographing an object of interest moving in a current preview image. The AR glass apparatus 1000 may adjust the degree of exposure of the camera 1003 to the determined degree of exposure.

The AR glass apparatus 1000 may, for example, adjust at least one of an International Organization for Standardization (ISO) value, a shutter speed, or an aperture value of the camera 1003 photographing the front of the AR glass apparatus 1000.

The influence of the ISO value, the shutter speed, and the aperture value of the camera 1003 upon the captured image is complex, such that the AR glass apparatus 1000 may, for example, determine an available range of each of the ISO value, the shutter speed, and the aperture value of the camera 1003 and adjust at least one of the ISO value, the shutter speed, or the aperture value of the camera 1003 through optimization from the determined each available range.

The AR glass apparatus 1000 may, for example, determine an available range of the aperture value for adjusting the degree of exposure of the camera 1003 based on a depth of the determined object of interest in the preview image.

The AR glass apparatus 1000 may, as another example, determine an available range of the shutter speed for adjusting the degree of exposure of the camera 1003 based on the moving speed of the determined object of interest in the preview image.

The AR glass apparatus 1000 may, as another example, determine an available range of the ISO value for adjusting the degree of exposure of the camera 1003 based on an illuminance of the determined object of interest in the image.

The AR glass apparatus 1000 may generate a control command for adjusting at least one of the ISO value, the shutter speed, or the aperture value of the camera 1003, based on the determined available range of the shutter speed, the determined available range of the ISO value, or the determined available range of the aperture value.

The AR glass apparatus 1000 may photograph the front thereof through the camera 1003 in which the degree of exposure is adjusted.

The AR glass apparatus 1000 may, for example, capture a still image of the front of the AR glass apparatus 1000 through the camera 1003 in which the degree of exposure is adjusted.

The AR glass apparatus 1000 capturing the still image may, for example, obtain the local motion information and the global motion information from the image of the $(N-1)^{th}$ frame and the image of the $N^{th}$ frame which form the preview image captured through the camera 1003.

The AR glass apparatus 1000 may adjust the degree of exposure of the camera 1003, based on the obtained local motion information or global motion information. The AR glass apparatus 1000 may capture a still image of the front of the AR glass apparatus 1000 through the camera 1003 in which the degree of exposure is adjusted.

The AR glass apparatus 1000 may, as another example, capture a moving image of the front of the AR glass apparatus 1000 through the camera 1003 in which the degree of exposure is adjusted.

The AR glass apparatus 1000 capturing the moving image may, for example, obtain the local motion information and the global motion information from the image of the $(N-1)^{th}$ frame and the image of the N frame which form the preview image captured through the camera 1003.

The AR glass apparatus 1000 may adjust the degree of exposure of the camera 1003, based on the obtained local motion information or global motion information. The AR glass apparatus 1000 may start capturing of the moving image of the front of the AR glass apparatus 1000 through the camera 1003 in which the degree of exposure is adjusted.

During capturing of the moving image, the AR glass apparatus 1000 may obtain the local motion information and the global motion information in real time from a plurality of frames forming the captured moving image. The AR glass apparatus 1000 may adjust the degree of exposure of the camera 1003 in real time, based on the local motion information and the global motion information that are obtained from the captured moving image.

Hereinbelow, based on embodiments of the disclosure shown in FIGS. 2 and 3, a description will be made of a difference between a method of adjusting a degree of exposure of a camera of an AR glass apparatus according to the related art and a method of adjusting a degree of exposure of a camera of an AR glass apparatus according to some embodiments of the disclosure.

Figure 2:
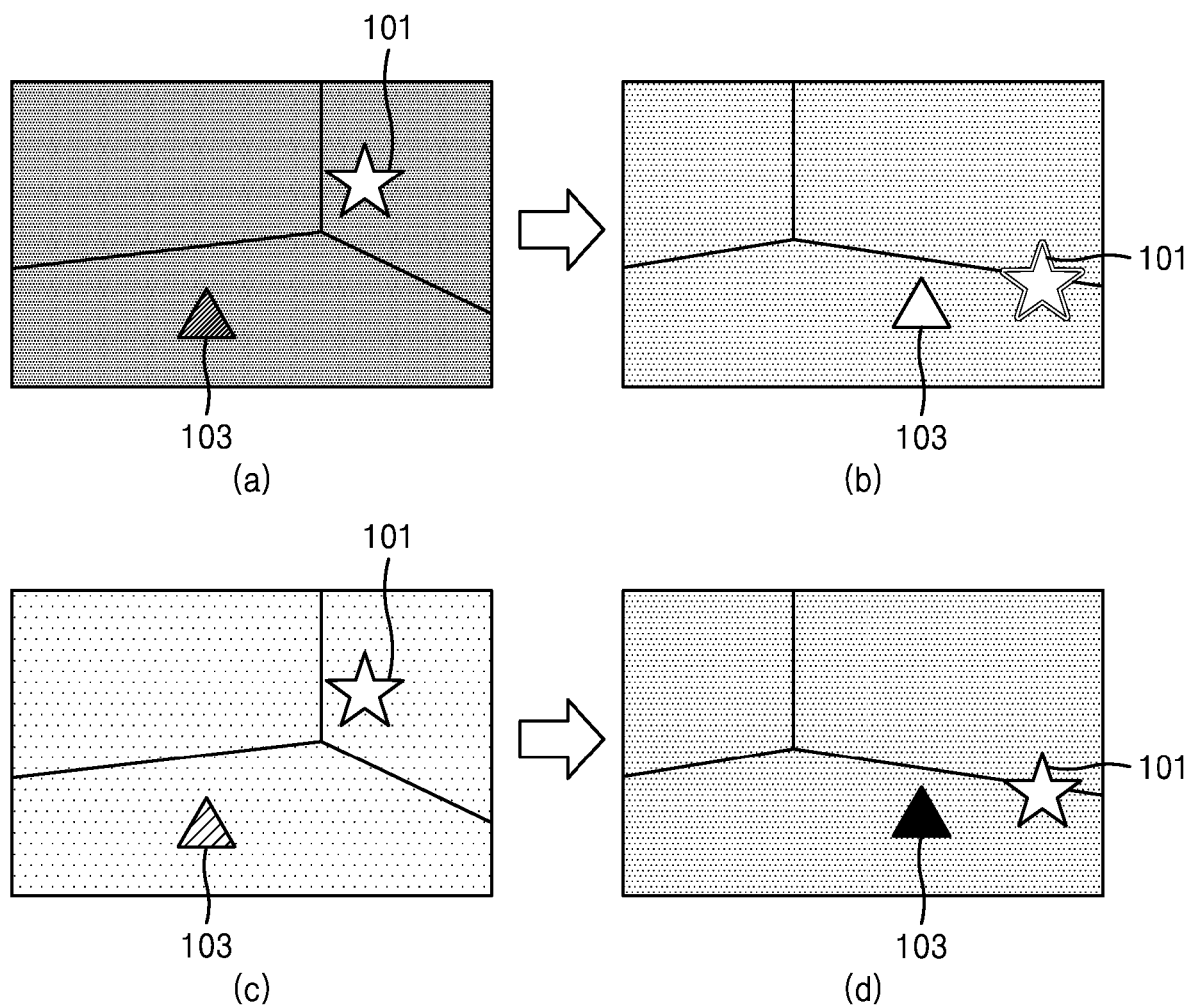
FIG. 2 illustrates a method of adjusting a degree of exposure of a camera performed by an AR glass apparatus according to the related art.

FIG. 2 illustrates a method of adjusting a degree of exposure of a camera performed by a conventional AR glass apparatus.

Referring to FIG. 2, the AR glass apparatus according to the related art may generally adjust a degree of exposure of a camera based on a background of an image during the movement of the AR glass apparatus, the first object 101, and the second object 103. As such, the AR glass apparatus according to the related art may adjust the degree of exposure of the camera based on the background of the image regardless of whether an object of interest of the user is included, such that forms and colors of the first object 101 and the second object 103 in the image do not accurately appear.

The AR glass apparatus according to the related art may adjust the degree of exposure of the camera based on an illuminance of a background in an image captured in a relatively dark environment. (a) and (b) of FIG. 2 show an example in which as the AR glass apparatus according to the related art raises a degree of exposure of a camera based on an illuminance of a background in an image captured in a relatively dark environment, excessively large exposure for an object in the image occurs. As the excessively large exposure occurs, at least one of the form or color of the first object 101 and the second object 103 in the image may be displayed differently from a real one.

The AR glass apparatus according to the related art may, as another example, adjust the degree of exposure of the camera based on an illuminance of a background in an image captured in a relatively bright environment. (c) and (d) of FIG. 2 show an example in which as the AR glass apparatus according to the related art lowers a degree of exposure of a camera based on an illuminance of a background in an image captured in a relatively bright environment, excessively small exposure for an object in the image occurs. As the excessively small exposure occurs, at least one of the form or color of the first object 101 and the second object 103 in the image may be displayed differently from a real one.

That is, the AR glass apparatus according to the related art may generally adjust the degree of exposure of the camera based on the background of the image, degrading the image quality of an object of interest of the user in the image.

Figure 3:
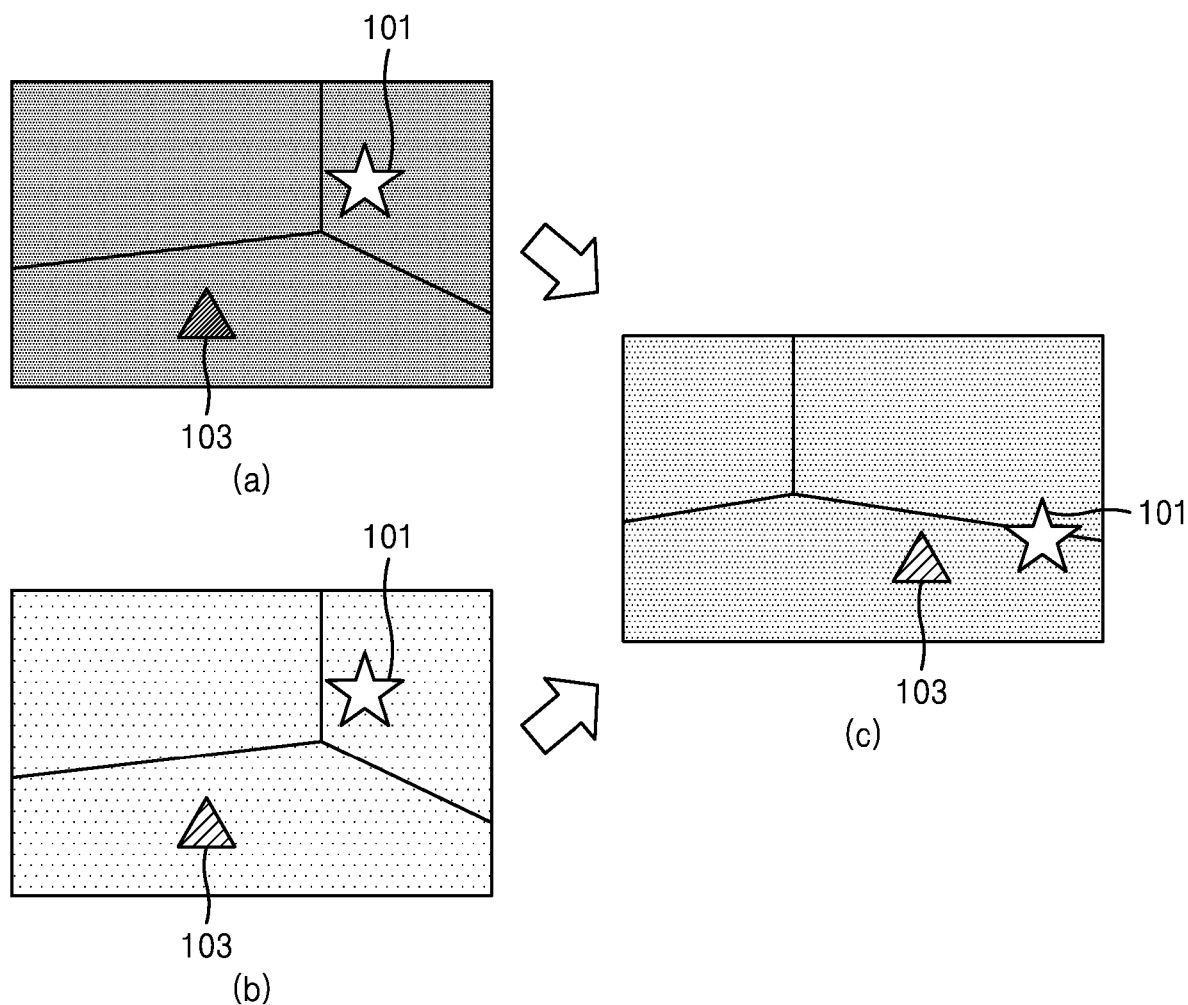
FIG. 3 illustrates a method of adjusting a degree of exposure of a camera performed by an AR glass apparatus according to some embodiments of the disclosure.

FIG. 3 illustrates a method of adjusting a degree of exposure of a camera performed by an AR glass apparatus according to some embodiments of the disclosure.

The AR glass apparatus 1000 according to some embodiments of the disclosure may determine the first object 101 and the second object 103 as objects of interest based on a result of tracking a gaze direction of the user 11 when the AR glass apparatus 1000, the first object 101, and the second object 103 move.

The AR glass apparatus 1000 may accurately indicate forms and colors of the first object 101 and the second object 103 in the image by adjusting a degree of exposure of the camera 1003 based on local motion information regarding objects of interest, when the first object 101 and the second object 103 that are the objects of interest move.

The AR glass apparatus 1000 may, for example, adjust the degree of exposure of the camera 1003 based on the object of interest in the image captured in the relatively dark environment. Referring to (a) and (c) of FIG. 3, as the AR glass apparatus 1000 raises the degree of exposure of the camera 1003 based on the first object 101 and the second object 103 that are captured in the relatively dark environment, the AR glass apparatus 1000 may capture an image through appropriate exposure for the object of interest.

The AR glass apparatus 1000 may, as another example, adjust the degree of exposure of the camera 1003 based on the object of interest in the image captured in the relatively bright environment. Referring to (b) and (c) of FIG. 3, as the AR glass apparatus 1000 lowers the degree of exposure of the camera 1003 based on the first object 101 and the second object 103 that are captured in the relatively bright environment, the AR glass apparatus 1000 may capture an image through appropriate exposure for the object of interest.

That is, unlike the AR glass apparatus according to the related art, the AR glass apparatus 1000 according to the disclosure may adjust the degree of exposure of the camera 1003 based on an object of interest of the user, thereby preventing the image quality of the object of interest of the user in the image from being degraded.

Figure 4:
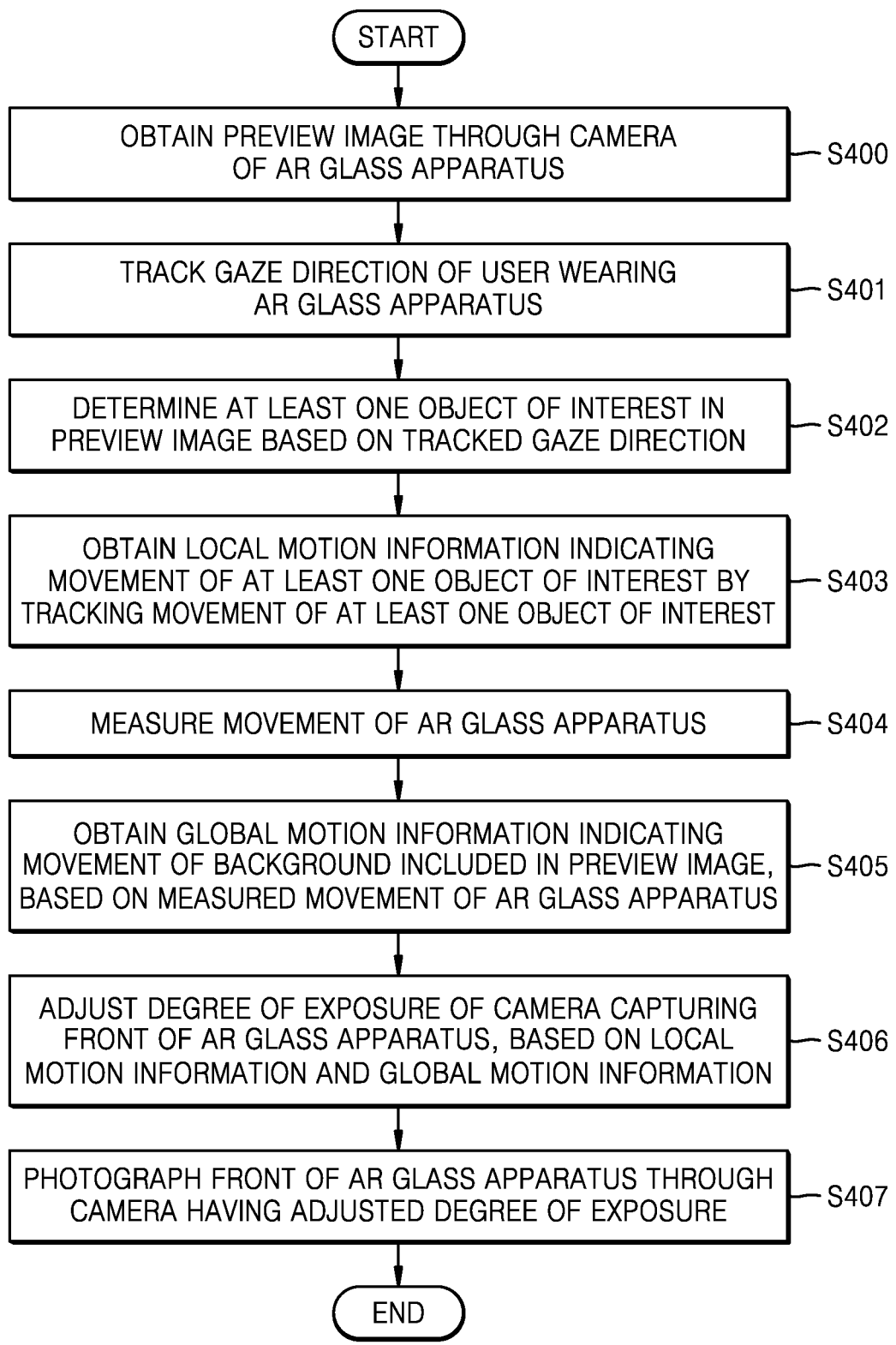
FIG. 4 is a flowchart illustrating a method of adjusting a degree of exposure of a camera performed by an AR glass apparatus according to some embodiments of the disclosure.

FIG. 4 is a flowchart illustrating a method of adjusting a degree of exposure of a camera performed by an AR glass apparatus according to some embodiments of the disclosure.

Referring to FIG. 4, in operation S400, the AR glass apparatus 1000 may obtain a preview image through a camera of the AR glass apparatus 1000.

In operation S401, the AR glass apparatus 1000 may track the direction of a gaze of the user 11 wearing the AR glass apparatus 1000.

In operation S402, the AR glass apparatus 1000 may determine at least one object of interest in a preview image, based on the tracked direction of the gaze. The AR glass apparatus 1000 may, for example, determine an object of interest in the preview image, based on image analysis with respect to a region corresponding to the tracked gaze direction in the preview image.

In operation S403, the AR glass apparatus 1000 may obtain local motion information indicating the movement of the object of interest by tracking the movement of the determined at least one object of interest. The AR glass apparatus 1000 may, for example, track the position change of the object of interest in each frame of the preview image and obtain the local motion information based on a result of tracking the position change.

In operation S404, the AR glass apparatus 1000 may measure the movement of the AR glass apparatus 1000 through a motion sensor. The AR glass apparatus 1000 may, for example, control a motion sensor to measure at least one of a position, a direction, a speed, or an acceleration of the AR glass apparatus 1000.

In operation S405, the AR glass apparatus 1000 may obtain global motion information indicating motion of a background region included in the preview image, based on the measured movement of the AR glass apparatus 1000. The AR glass apparatus 1000 may, for example, determine a background region included in the preview image, and track the movement of the background region based on a result of measuring the movement of the AR glass apparatus 1000. The AR glass apparatus 1000 may obtain the global motion information based on a result of tracking the movement of the AR glass apparatus 1000.

In operation S406, the AR glass apparatus 1000 may adjust the degree of exposure of the camera 1003 capturing the front of the AR glass apparatus 1000, based on the obtained local motion information or global motion Information. The AR glass apparatus 1000 may, for example, adjust at least one of an ISO value, a shutter speed, or an aperture value of the camera 1003 photographing the front of the AR glass apparatus 1000 to adjust the degree of exposure of the camera 1003 capturing the front of the AR glass apparatus 1000.

In operation S407, the AR glass apparatus 1000 may photograph the front thereof through the camera 1003 having the adjusted degree of exposure.

Figure 5:
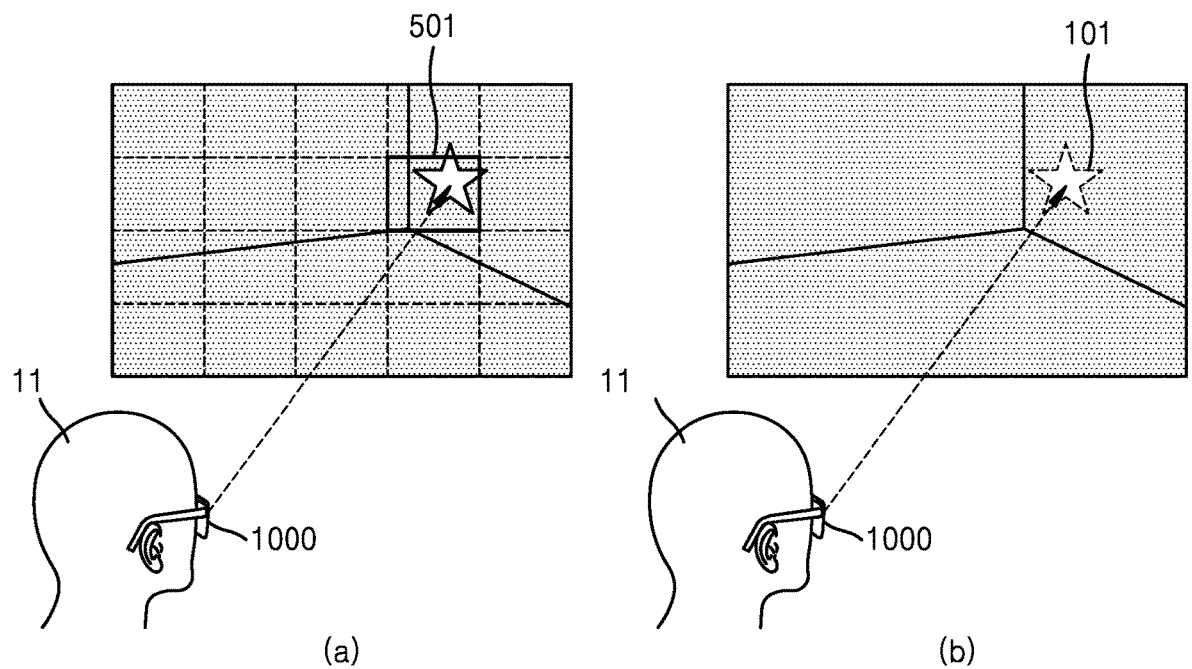
FIG. 5 illustrates a method of identifying an object of interest based on a user's gaze direction performed by an AR glass apparatus according to some embodiments of the disclosure.

FIG. 5 illustrates a method of identifying an object of interest based on a user's gaze direction performed by an AR glass apparatus according to some embodiments of the disclosure.

The AR glass apparatus 1000 according to an embodiment of the disclosure may determine an object of interest based on image analysis with respect to a region corresponding to the gaze direction of the user 11 in the entire region of the preview image captured through the camera 1003.

Referring to (a) of FIG. 5, the AR glass apparatus 1000 may determine a region corresponding to the gaze direction of the user 11 in the entire region of the preview image.

The AR glass apparatus 1000 may, for example, divide the entire region of the preview image into blocks, each of which has a certain area. The AR glass apparatus 1000 may determine a block corresponding to the gaze direction of the user 11 among the divided blocks as a region 501 corresponding to an object of interest.

The AR glass apparatus 1000 may, for example, determine the gaze direction of the user 11 by projecting light generated through a separate light source to eyes of the user 11.

The AR glass apparatus 1000 may, for example, further include an infrared light source and a light detection sensor to determine the gaze direction of the user 11. The AR glass apparatus 1000 may project light generated by the infrared light source to the eyes of the user 11 and measure the amount of light reflected from corneas of the eyes of the user 11 through the light detection sensor, thus determining a reflection angle of the light. The AR glass apparatus 1000 may determine the direction of the gaze of the user 11, based on the determined reflection angle of the light.

The AR glass apparatus 1000 may, as another example, further include a near infrared light source and a gaze direction tracking camera to determine the gaze direction of the user 11. The AR glass apparatus 1000 may project the light generated by the near infrared light source to the eye of the user 11 and identify a position of a pupil of the user 11 and a position of light focused on the eye of the user 11 by using the gaze direction tracking camera. The AR glass apparatus 1000 may determine the gaze direction of the user 11 based on a relative position between the identified position of the pupil of the user 11 and the identified position of the light focused on the eye of the user 11.

While a description has been made of an embodiment of the disclosure using a scheme in which the AR glass apparatus 1000 projects the light generated through the separate light source to the eye of the user 11 to determine the gaze direction of the user 11, the AR glass apparatus 1000 does not necessarily use such a scheme for gaze tracking.

Referring to (b) of FIG. 5, the AR glass apparatus 1000 may determine whether an object is included in the region 501 corresponding to an object of interest.

The AR glass apparatus 1000 may, for example, extract an object included in a frame-specific image based on a result of comparing frame-specific images obtained from the preview image captured through the camera 1003. The AR glass apparatus 1000 may, for example, compare colors of frame-specific RGB images of the preview image captured through the camera 1003 to obtain a color difference and extract an object from the frame-specific image based on the obtained color difference.

The AR glass apparatus 1000 may, for example, compare object detection results based on the region 501 corresponding to the object of interest and the image analysis to determine whether at least a part of the object is included in the region 501 corresponding to the object of interest. The AR glass apparatus 1000 may, for example, determine the first object 101, a partial region of which is included in the region 501 corresponding to the object of interest, as an object of interest.

Figure 6:
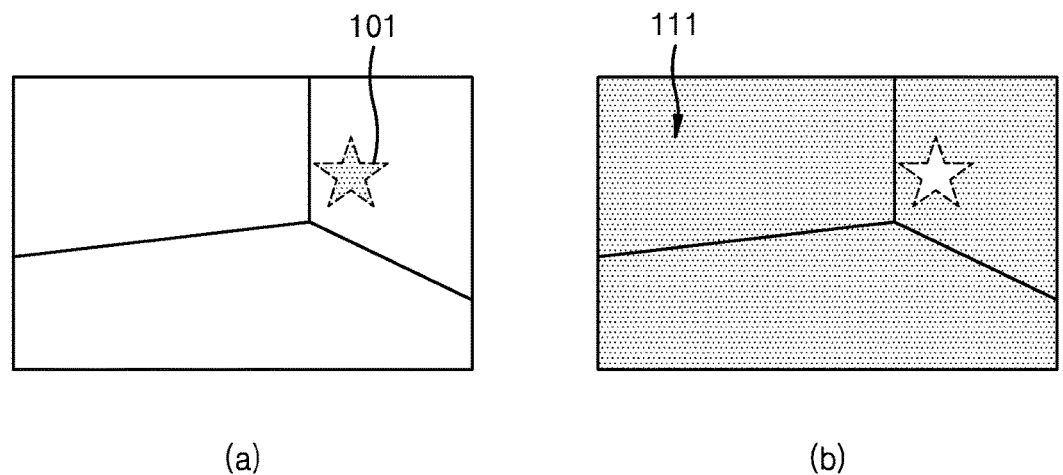
FIG. 6 illustrates a method of determining an object of interest and a background region in an image performed by an AR glass apparatus according to some embodiments of the disclosure.

FIG. 6 illustrates a method of determining an object of interest and a background region in an image performed by an AR glass apparatus according to some embodiments of the disclosure.

The AR glass apparatus 1000 according to an embodiment of the disclosure may determine an object of interest based on image analysis with respect to a region corresponding to the gaze direction of the user 11 in the entire region of the preview image.

Referring to (a) of FIG. 6, the first object 101 determined as the object of interest by the AR glass apparatus 1000 is shaded. The AR glass apparatus 1000 may obtain local motion information indicating the movement of the first object 101 that is the object of interest, by tracking the movement of the first object 101.

The AR glass apparatus 1000 may, for example, determine, as a background region, the remaining region except for the region corresponding to the object of interest in the entire region of the preview image.

Referring to (b) of FIG. 6, the remaining region except for the region corresponding to the first object 101 determined as the object of interest by the AR glass apparatus 1000, i.e., a background region 111, is shaded. The AR glass apparatus 1000 may obtain global motion information indicating the movement of the background region 111, by tracking the movement of the background region 111.

Meanwhile, the AR glass apparatus 1000 may, as another example, determine the entire region of the captured image as the background region, based on a rate of a region occupied by the first object 101 that is the object of interest with respect to the entire region of the preview image. The AR glass apparatus 1000 may, for example, determine the entire region of the preview image as the background region, when a rate of the region occupied by the first object 101 that is the object of interest with respect to the entire region of the preview image is less than or equal to a preset threshold rate.

When the AR glass apparatus 1000 determines the entire region of the image as the background region, the AR glass apparatus 1000 may obtain global motion information indicating the movement of the background region by tracking the movement of the entire region of the preview image.

Figure 7:
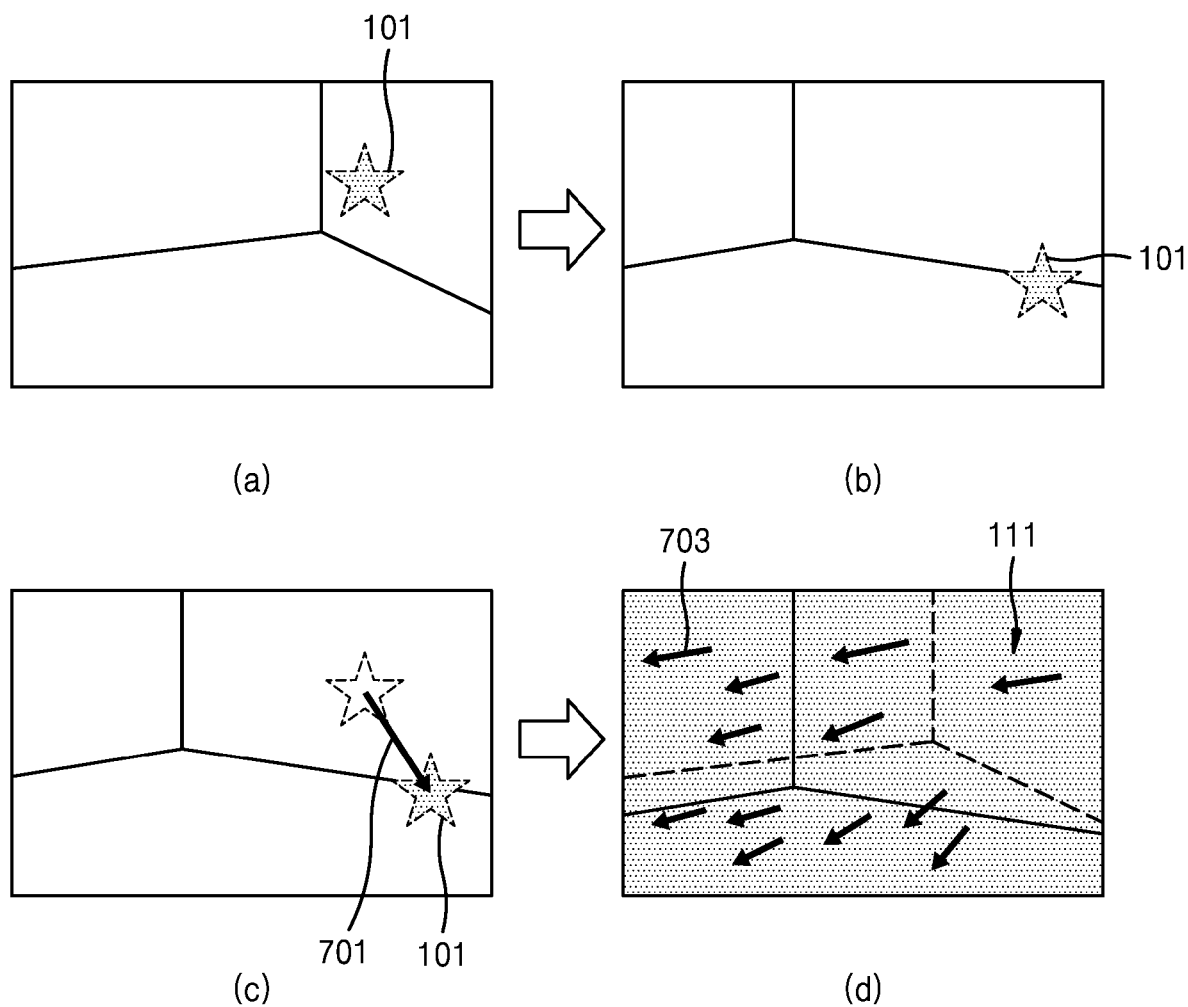
FIG. 7 illustrates a method of obtaining local motion information and global motion information performed by an AR glass apparatus according to some embodiments of the disclosure.

FIG. 7 illustrates a method of obtaining local motion information and global motion information performed by an AR glass apparatus according to some embodiments of the disclosure.

Referring to (a) of FIG. 7, an image of an $(N-1)^{th}$ frame forming a preview image captured through the camera 1003 in the AR class apparatus 1000 according to some embodiments of the disclosure is illustrated. The image of the $(N-1)^{th}$ frame may include, for example, the first object 101 determined as an object of interest.

Referring to (b) of FIG. 7, an image of an $N^{th}$ frame forming a preview image captured through the camera 1003 in the AR class apparatus 1000 according to some embodiments of the disclosure is illustrated. The image of the N frame may, for example, become different from the image of the $(N-1)^{th}$ frame, upon change of the spatial position of the first object 101 determined as the object of interest simultaneously with rotation of the head of the user 11 wearing the AR glass apparatus 1000 in a certain direction.

That is, comparing (a) of FIG. 7 with (b) of FIG. 7, as the first object 101 determined as the object of interest moves on a space, a position of the first object 101 in the image moves to a right lower end, and as the head of the user 11 wearing the AR glass apparatus 1000 rotates to the right, a position of a wall that is the background region moves to the left.

The AR glass apparatus 1000 may, for example, track the position change of the first object 101 in the (N−1)$^{th}$ frame and the N frame in the preview image and obtain local motion information indicating the movement of the first object 101 based on a result of tracking the position changes.

Referring to (c) of FIG. 7, the AR glass apparatus 1000 may obtain the local motion information indicating the movement of the first object 101 by detecting the position change of the first object 101 in the preview image over time. The local motion information regarding the movement of the first object 101 may include, for example, information about a moving direction, a moving speed, and a motion vector 701 of the first object 101 in the image.

The AR glass apparatus 1000 may, for example, track the position change of the background region in the (N−1)$^{th}$ frame and the N$^{th}$ frame in the preview image and obtain global motion information indicating the movement of the background region based on a result of tracking the position change.

Referring to (d) of FIG. 7, the AR glass apparatus 1000 may obtain the global motion information indicating the movement of the background region by detecting the position change of the background region in the preview image over time. The global motion information regarding the movement of the background region may include, for example, information about a moving direction, a moving speed, and a motion vector 703 of the background region.

Figure 8:
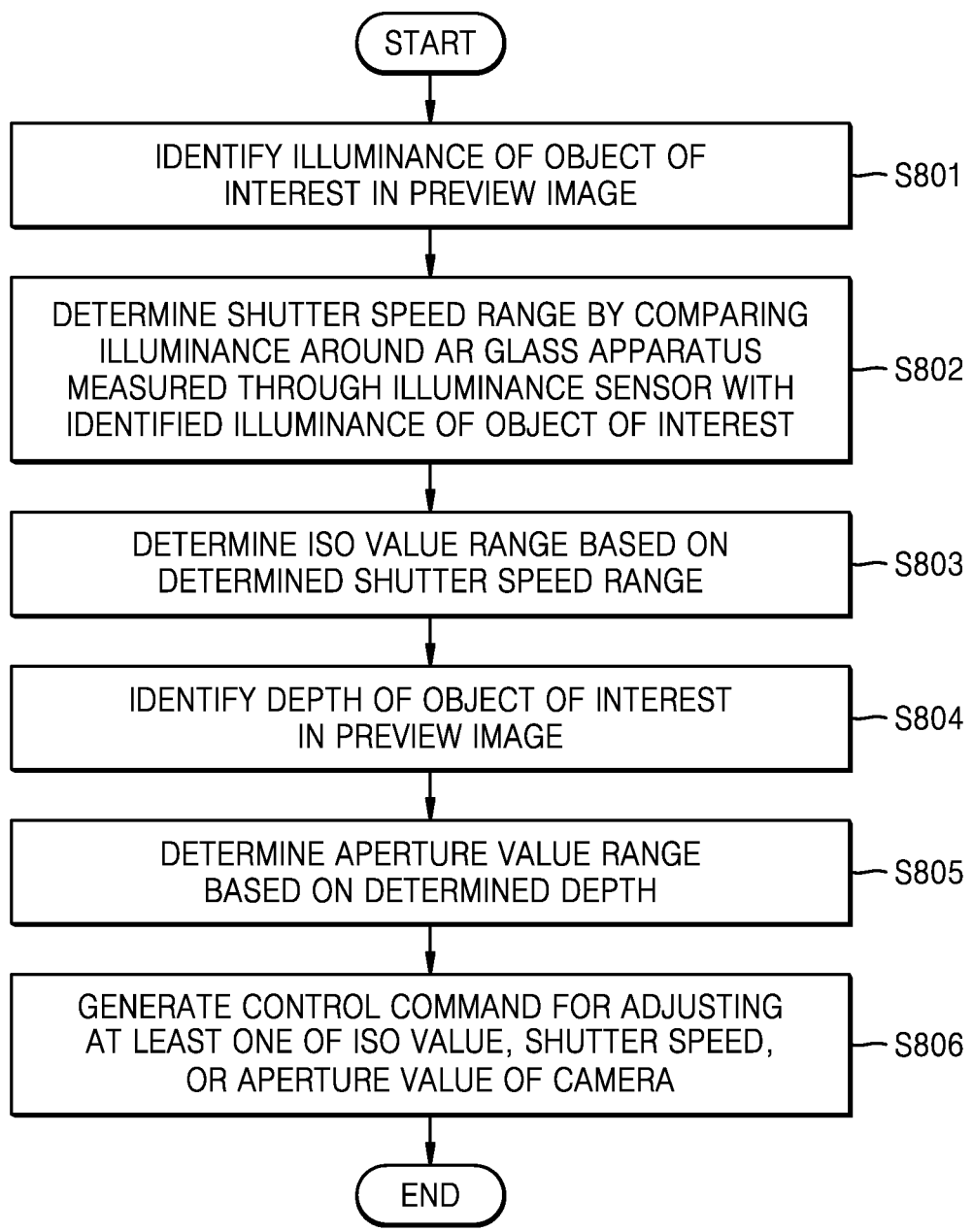
FIG. 8 is a flowchart illustrating a method of generating a control command to adjust a degree of exposure of a camera performed by an AR glass apparatus according to some embodiments of the disclosure.

FIG. 8 is a flowchart illustrating a method of generating a control command to adjust a degree of exposure of a camera performed by an AR glass apparatus according to some embodiments of the disclosure.

Referring to FIG. 8, in operation S801, the AR glass apparatus 1000 according to some embodiments of the disclosure may identify an illuminance of an object of interest in a preview image captured through the camera 1003.

The AR glass apparatus 1000 may, for example, analyze the preview image captured through the camera 1003 to obtain measurement information regarding the object of interest in the preview image. The AR glass apparatus 1000 may generate the measurement information through measurement with respect to the object of interest occupying a partial region of the preview image. The AR glass apparatus 1000 may identify a current degree of exposure of the camera 1003 for the object of interest based on the generated measurement Information for the object of Interest.

In operation S802, the AR glass apparatus 1000 may determine a shutter speed range based on an illuminance around the AR glass apparatus 1000, which is measured through an illuminance sensor, and the identified illuminance of the object of interest.

The AR glass apparatus 1000 may, for example, determine a shutter speed range that is appropriate for the moving speed of the object of interest, by comparing an illuminance around the AR glass apparatus 1000, which is measured through an illuminance sensor, and the illuminance of the object of interest.

The determined shutter speed range may include a plurality of shutter speeds capable of adjusting the degree of exposure to clearly express the form and color of the object of interest based on the illuminance around the AR glass apparatus 1000, measured by the illuminance sensor, and preventing occurrence of motion blur for the object of interest.

In operation S803, the AR glass apparatus 1000 may determine an ISO value range based on the determined shutter speed range. The determined ISO value range may, for example, include a plurality of ISO values capable of reducing noise of the image to a certain threshold value or less in the illuminance around the AR glass apparatus 1000 measured through the illuminance sensor and the determined shutter speed range.

In operation 6804, the AR glass apparatus 1000 may identify a depth of the object of interest in the preview image. In operation S805, the AR glass apparatus 1000 may determine an aperture value range based on the determined depth.

The AR glass apparatus 1000 may, for example, determine a depth-if-filled for a plurality of objects of interest having different depths when the plurality of objects of interest are included in the preview image. The depth-if-filled may mean a distance between an object of interest located closest to the camera 1003 and an object of interest located farthest from the camera 1003 in which the camera 1003 captures a clear image. The AR glass apparatus 1000 may determine the aperture value range based on the determined depth-if-filled.

The determined aperture value range may, for example, include a plurality of aperture values capable of preventing occurrence of blur for the object of interest.

In operation S806, the AR glass apparatus 1000 may generate a control command for adjusting at least one of the ISO value, the shutter speed, or the aperture value of the camera 1003, based on the determined available range of the shutter speed, the determined available range of the ISO value, or the determined available range of the aperture value.

Figure 9:
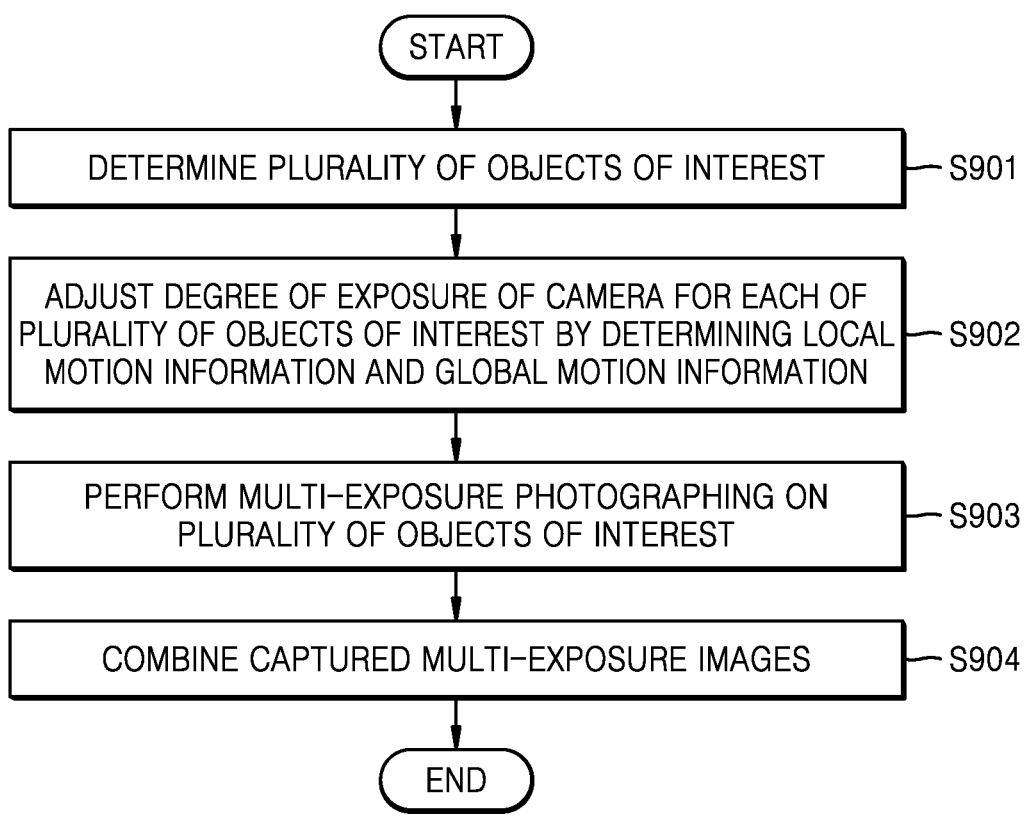
FIG. 9 is a flowchart illustrating a method of obtaining a high-dynamic-range (HDR) image through adjustment of a degree of exposure of a camera for a plurality of objects of interest performed by an AR glass apparatus according to some embodiments of the disclosure.

FIG. 9 is a flowchart illustrating a method of obtaining a high-dynamic-range (HDR) image through adjustment of a degree of exposure of a camera for a plurality of objects of interest performed by an AR glass apparatus according to some embodiments of the disclosure.

Referring to FIG. 9, in operation S901, the AR glass apparatus 1000 according to some embodiments of the disclosure may determine a plurality of objects of interest in the preview image captured through the camera 1003, based on the tracked gaze direction of the user.

The AR glass apparatus 1000 may, for example, compare the preview image captured through the camera 1003 with the result of tracking the gaze direction of the user 11 to identify positions and forms of a plurality of objects at which the user 11 gazes in the preview image.

The AR glass apparatus 1000 may determine a plurality of objects of Interest in the preview image captured through the camera 1003, based on a result of identifying the plurality of objects at which the user 11 gazes.

In operation S902, the AR glass apparatus 1000 may determine local motion information and global motion information and adjust the degree of exposure of the camera 1003 for each of the plurality of objects of interest.

In operation S903, the AR glass apparatus 1000 may perform multi-exposure photographing with respect to the plurality of objects of interest. The AR glass apparatus 1000 may, for example, adjust the degree of exposure of the camera 1003 for each of the plurality of objects of interest and perform multi-exposure photographing by applying a different degree of exposure to each of the plurality of objects of interest based on the adjusted degree of exposure.

In operation S904, the AR glass apparatus 1000 may combine captured multi-exposure images. The AR glass apparatus 1000 may, for example, generate a new image by combining the captured multi-exposure images.

Figure 10:
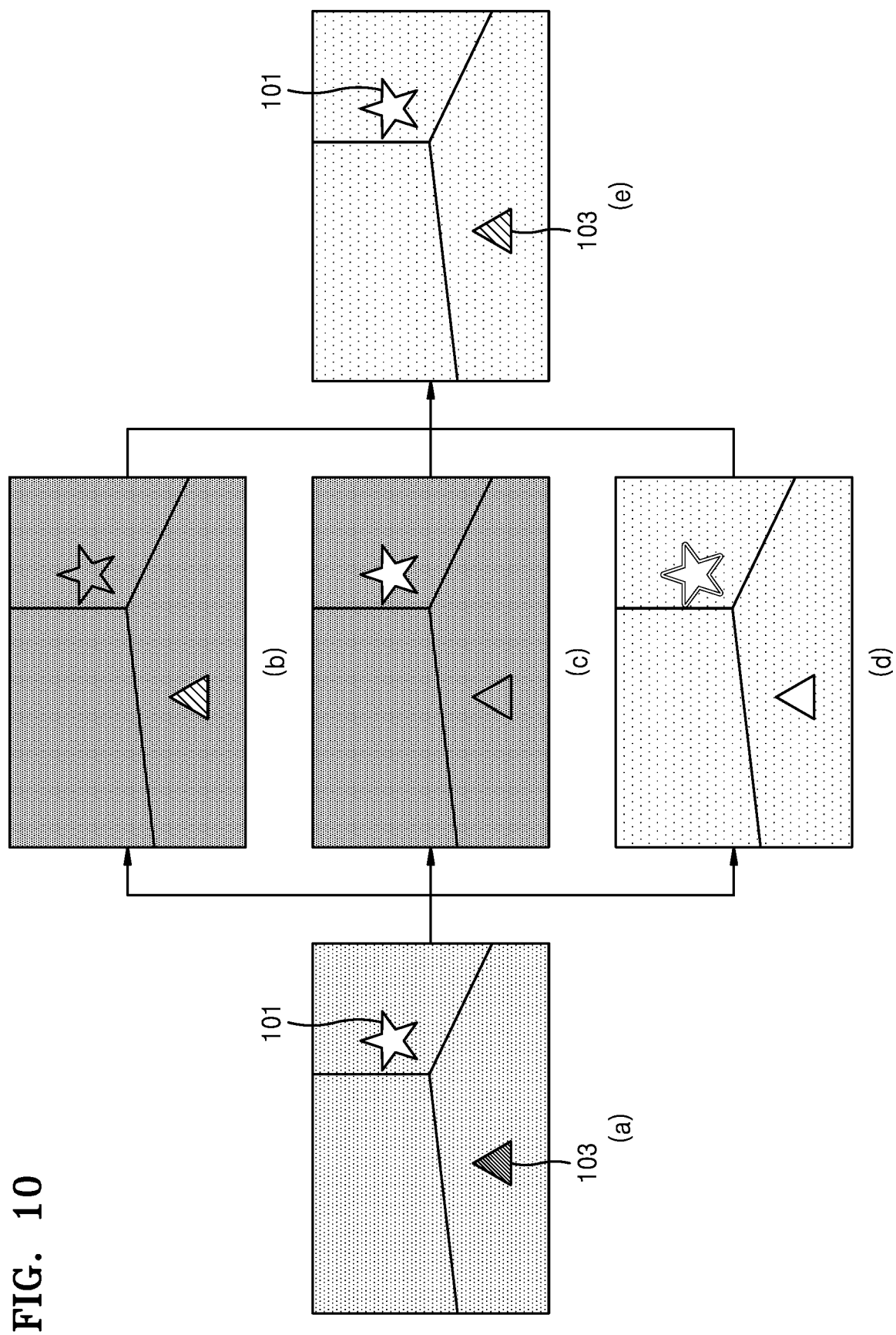
FIG. 10 is a flowchart illustrating a method of obtaining an HDR image through adjustment of a degree of exposure of a camera for a plurality of objects of interest performed by an AR glass apparatus according to some embodiments of the disclosure.

FIG. 10 is a flowchart illustrating a method of obtaining an HDR image through adjustment of a degree of exposure of a camera for a plurality of objects of interest performed by an AR glass apparatus according to some embodiments of the disclosure.

When a plurality of objects of interest are included in a preview image, the AR glass apparatus 1000 according to some embodiments of the disclosure may perform multi-exposure photographing including adjusting a degree of exposure of the camera 1003 for each of the plurality of objects and obtain a new image by combining captured images.

Referring to (a) of FIG. 10, the image captured by the AR glass apparatus 1000 may, for example, include the first object 101 and the second object 103 located in front of the AR glass apparatus 1000.

The AR glass apparatus 1000 may determine at least one object of interest in the preview image captured through the camera 1003, based on a result of identifying the at least one object at which the user 11 gazes. The AR glass apparatus 1000 may, for example, determine the first object 101 and the second object 103 at which the user 11 gazes in the preview image as objects of interest, based on a result of tracking the gaze direction of the user 11.

The AR glass apparatus 1000 may, for example, track position changes of the first object 101 and the second object 103, and obtain local motion information indicating the movement of the first object 101 and the second object 103 based on a tracking result. The local motion information obtained by the AR glass apparatus 1000 may include, for example, information about a moving direction, a moving speed, and a motion vector of the first object 101 and the second object 103.

The AR glass apparatus 1000 may, for example, determine, as a background region, the remaining region except for the region corresponding to the first object 101 and the second object 103 that are determined as objects of interest in the entire region of the preview image.

The AR glass apparatus 1000 may obtain the global motion information based on a result of the image analysis for the movement of the background region and a result of measuring the movement of the AR glass apparatus 1000. The global motion information obtained by the AR glass apparatus 1000 may include, for example, information about a moving direction, a moving speed, and a motion vector of the background region.

The AR glass apparatus 1000 may, for example, perform multi-exposure photographing including adjusting a degree of exposure of the camera 1003 for each of the first object 101, the second object 103, and the background region, based on the local motion information indicating the movement of the first object 101 and the second object 103 and the global motion information indicating the movement of the background region.

The AR glass apparatus 1000 may, for example, adjust the degree of exposure of the camera 1003 for the first object 101, based on the obtained local motion information. That is, the AR glass apparatus 1000 may capture an image including all of the first object 101, the second object 103, and the background region by using the camera 1003 having a degree of exposure adjusted for the first object 101.

Referring to (c) of FIG. 10, a first frame image captured using the camera 1003 having a degree of exposure adjusted for the first object 101, in the AR glass apparatus 1000 is illustrated. The first frame image is captured using the camera 1003 adjusted to have an appropriate degree of exposure for the first object 101, such that the form and the color of the second object 103 may be unclearly expressed when compared to those of the first object 101, in the first frame image.

The AR glass apparatus 1000 may, for example, adjust the degree of exposure of the camera 1003 for the second object 103, based on the obtained local motion information. That is, the AR glass apparatus 1000 may capture an image including all of the first object 101, the second object 103, and the background region by using the camera 1003 having a degree of exposure adjusted for the second object 103.

Referring to (b) of FIG. 10, a second frame image captured using the camera 1003 having a degree of exposure adjusted for the second object 103, in the AR glass apparatus 1000 is illustrated. The second frame image is captured using the camera 1003 adjusted to have an appropriate degree of exposure for the second object 103, such that the form and the color of the first object 101 may be unclearly expressed when compared to those of the second object 103, in the second frame image.

The AR glass apparatus 1000 may, for example, adjust the degree of exposure of the camera 1003 for the background region, based on the obtained global motion information. That is, the AR glass apparatus 1000 may capture an image including all of the first object 101, the second object 103, and the background region by using the camera 1003 having a degree of exposure adjusted for the background region.

Referring to (d) of FIG. 10, a third frame image captured using the camera 1003 having a degree of exposure adjusted for the background region, in the AR glass apparatus 1000 is illustrated. The third frame image is captured using the camera 1003 adjusted to have an appropriate degree of exposure for the background region, such that the forms and the colors of the first object 101 and the second object 103 in the third frame image may be unclearly expressed when compared to those in the first frame image and in the second frame image.

The AR glass apparatus 1000 obtaining the first frame image through the third frame image by performing multi-exposure photographing may obtain a new frame image by combining captured frame images.

The AR glass apparatus 1000 may, for example, obtain a new image by combining all regions of the first frame image through the third frame image. The AR glass apparatus 1000 may, as another example, divide a region corresponding to each object of interest in the first frame image and the second frame image and obtain a new image by combining the divided regions with a background region of the third frame image. That is, the AR glass apparatus 1000 may combine images captured through an appropriate exposure for each of the first object 101, the second object 103, and the background region, thereby obtaining an image in which the first object 101, the second object 103, and the background region are clearly expressed.

Figure 11:
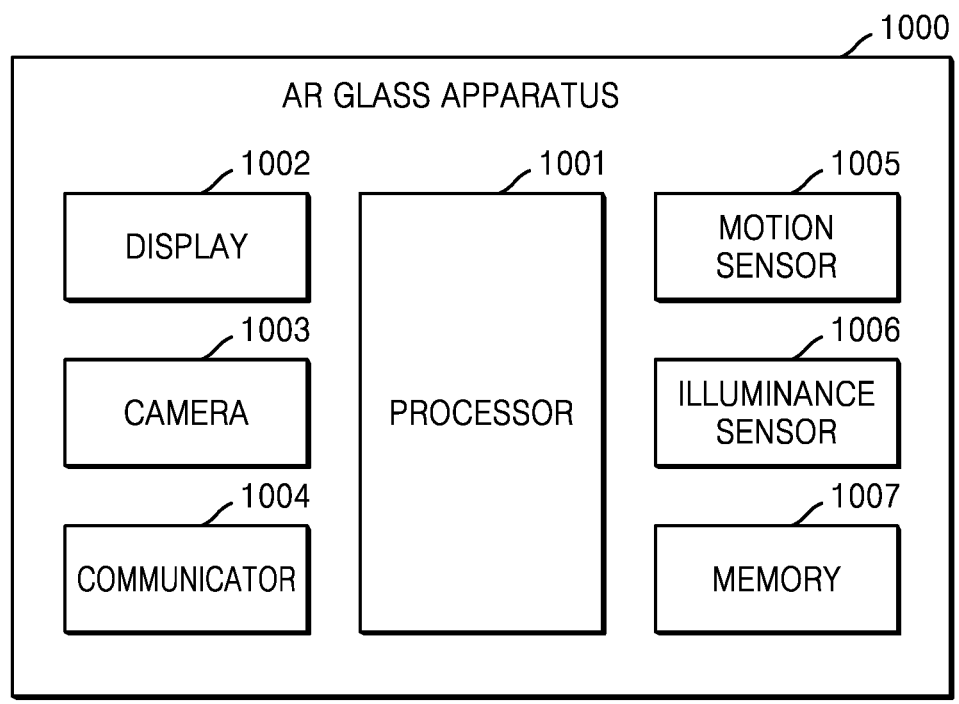
FIG. 11 is a block diagram of an AR glass apparatus according to some embodiments of the disclosure.

FIG. 11 is a block diagram of an AR glass apparatus according to some embodiments of the disclosure.

Referring to FIG. 11, the AR glass apparatus 1000 according to an embodiment of the disclosure may include a processor 1001, a display 1002, the camera 1003, a communicator 1004, a motion sensor 1005, an illuminance sensor 1006, and a memory 1007.

The processor 1001 may control the display 1002 to display information processed by the AR glass apparatus 1000. The processor 1001 may, for example, control the display 1002 to display a user interface for controlling the AR glass apparatus 1000, a user interface for displaying a state of the AR glass apparatus 1000, etc.

The processor 1001 may obtain a preview image through the camera 1003 of the AR glass apparatus 1000.

The processor 1001 may track the direction of a gaze of the user 11 wearing the AR glass apparatus 1000.

The processor 1001 may determine at least one object of interest in a preview image, based on the tracked direction of the gaze. The processor 1001 may, for example, determine an object of interest in the preview image, based on image analysis with respect to a region corresponding to the tracked gaze direction in the preview image.

The processor 1001 may obtain local motion information indicating a movement of an object of interest by tracking a movement of the at least one object of interest. The processor 1001 may, for example, track the position change of the object of interest in each frame of the preview image and obtain the local motion information based on a result of tracking the position change.

The processor 1001 may control the motion sensor 1005 to measure a movement of the AR glass apparatus 1000. The processor 1001 may, for example, control the motion sensor 1005 to measure at least one of a position, a direction, a speed, or an acceleration of the AR glass apparatus 1000.

The processor 1001 may obtain global motion information Indicating motion of a background region included in the preview image, based on the measured movement of the AR glass apparatus 1000. The processor 1001 may, for example, determine a background region included in the preview image, and track a movement of the background region based on a result of measuring movement of the AR glass apparatus 1000. The AR glass apparatus 1000 may obtain the global motion information based on a result of tracking the movement of the AR glass apparatus 1000.

The processor 1001 may adjust the degree of exposure of the camera 1003 capturing the front of the AR glass apparatus 1000, based on the obtained local motion information or global motion information.

The processor 1001 may control the illuminance sensor 1006 to measure an illuminance around the AR glass apparatus 1000. The processor 1001 may adjust the degree of exposure of the camera 1003 capturing the front of the AR glass apparatus 1000, based on the measured illuminance around the AR glass apparatus 1000.

The processor 1001 may, for example, adjust at least one of an ISO value, a shutter speed, or an aperture value of the camera 1003 photographing the front of the AR glass apparatus 1000 to adjust the degree of exposure of the camera 1003 capturing the front of the AR glass apparatus 1000.

The processor 1001 may, for example, identify an illuminance of an object of interest in the preview image. The processor 1001 may determine a shutter speed range by comparing the illuminance around the AR glass apparatus 1000, measured through the illuminance sensor 1006 with the identified illuminance of the object of Interest. The processor 1001 may determine an ISO value range based on the determined shutter speed range.

The processor 1001 may, for example, identify a depth of the object of Interest in the preview image and determine an aperture value range based on the identified depth.

The processor 1001 may generate a control command for adjusting at least one of the ISO value, the shutter speed, or the aperture value of the camera 1003, based on the determined shutter speed range, the determined ISO value range, and the determined aperture value range. The processor 1001 may deliver the generated control command to the camera 1003.

The processor 1001 may control the camera 1003 having the adjusted degree of exposure to photograph the front of the AR glass apparatus 1000.

The communicator 1004 may include one or more communication modules for communication with the external device. The communicator 1004 may, for example, include a short-range communicator and a mobile communicator.

The short-range communicator may include, but not limited to, a Bluetooth Low Energy (BLE) communication unit, a near field communication (NFC) unit, a wireless local area network (WLAN) (WiFi) communication unit, a ZigBee communication unit, an infrared Data Association (IrDA) communication unit, a WiFi Direct (WFD) communication unit, an ultra wideband (UWB) communication unit, and an Ant+ communication unit.

The mobile communicator may transmit and receive a radio signal to and from at least one of a base station, an external terminal, and a server over a mobile communication network. The radio signal may include various forms of data corresponding to transmission/reception of a voice call signal, a video communication call signal, or a text/multimedia message.

The memory 1007 may store a program for controlling an operation of the AR glass apparatus 1000. The memory 1007 may include at least one instruction for controlling an operation of the AR glass apparatus 1000. The programs stored in the memory 1007 may be classified into a plurality of modules according to functions thereof.

The memory 1007 may include at least one type of storage medium among flash memory, a hard disk, a multimedia card micro, card-type memory (e.g., secure digital (SD) or extreme digital (XD) memory), random access memory (RAM), static random access memory (SRAM), read-only memory (ROM), electrically erasable programmable ROM (EEPROM), programmable ROM (PROM), magnetic memory, a magnetic disc, or an optical disc.

Some embodiments of the disclosure may be implemented with a recording medium including a computer-executable instruction such as a computer-executable programming module. A computer-readable recording medium may be an available medium that is accessible by a computer, and includes all of a volatile medium, a non-volatile medium, a separated medium, and a non-separated medium. The computer-readable recording medium may also include both a computer storage medium. The computer storage medium includes all of a volatile medium, a non-volatile medium, a separated medium, and a non-separated medium, which is implemented by a method or technique for storing information such as a computer-readable instruction, a data structure, a programming module, or other data. The storage medium may be provided as a non-transitory storage medium. Here, the term "non-transitory" means that the storage medium does not include a signal and is tangible but does not indicate whether data is stored in the storage medium semi-permanently or temporarily.

In the specification, the term "unit" may be a hardware component like a processor or a circuit, and/or a software component executed by a hardware component like a processor.

The disclosure may provide an AR glass apparatus and an operating method thereof, in which a degree of exposure of a camera capturing an image is adjusted based on information about the movement of an object of interest of a user and motion in a background region in a captured image, thereby preventing quality degradation of the image.

Those of ordinary skill in the art to which the disclosure pertains will appreciate that the disclosure may be implemented in different detailed ways without departing from the technical spirit or essential characteristics of the disclosure. Accordingly, the aforementioned embodiments of the disclosure should be construed as being only illustrative, but should not be constructed as being restrictive from all aspects. For example, each element described as a single type may be implemented in a distributed manner, and likewise, elements described as being distributed may be implemented as a coupled type.

The scope of the disclosure is defined by the following claims rather than the detailed description, and the meanings and scope of the claims and all changes or modified forms derived from their equivalents should be construed as falling within the scope of the disclosure.

What is claimed is:

1. An operating method of an augmented reality (AR) glass apparatus, the operating method comprising:
    obtaining a preview image through a camera of the AR glass apparatus;
    tracking a gaze direction of a user wearing the AR glass apparatus;
    determining at least one object of interest in the preview image based on the tracked gaze direction;
    obtaining local motion information indicating a movement of the at least one object of interest by tracking the movement of the at least one object of interest;
    measuring a movement of the AR glass apparatus;
    obtaining global motion information indicating a movement of a background region included in the preview image based on the measured movement of the AR glass apparatus;
    adjusting a degree of exposure of the camera based on the local motion information and the global motion information; and
    photographing a front of the AR glass apparatus through the camera having the adjusted degree of exposure.

2. The operating method of claim 1, further comprising:
    measuring an illuminance around the AR glass apparatus by using an illuminance sensor of the AR glass apparatus; and
    adjusting the degree of exposure of the camera based on the measured illuminance.

3. The operating method of claim 1, wherein the determining of the at least one object of interest comprises determining the at least one object of interest in the preview image based on image analysis with respect to a region corresponding to the tracked gaze direction in the preview image.

4. The operating method of claim 1, wherein the obtaining of the local motion information comprises:
    tracking a position change of the at least one object of interest in each frame of the preview image; and
    obtaining the local motion information based on a result of tracking the position change.

5. The operating method of claim 1, wherein the obtaining of the global motion information comprises:
    determining the background region included in the captured preview image;
    tracking the movement of the background region based on a result of measuring the movement of the AR glass apparatus; and
    obtaining the global motion information based on a result of tracking the movement of the background region.

6. The operating method of claim 1, wherein the measuring of the movement of the AR glass apparatus comprises measuring at least one of a position, a direction, a speed, or an acceleration of the AR glass apparatus.

7. The operating method of claim 1, wherein the adjusting of the degree of exposure of the camera comprises adjusting at least one of an International Organization for Standardization (ISO) value, a shutter speed, or an aperture value of the camera.

8. The operating method of claim 7, wherein the adjusting of the degree of exposure of the camera comprises:
    identifying an illuminance of the at least one object of interest in the preview image;
    determining a range of the shutter speed by comparing an illuminance around the AR glass apparatus measured through an illuminance sensor with the identified illuminance of the at least one object of interest; and
    determining a range of the ISO value based on the determined range of the shutter speed.

9. The operating method of claim 8, wherein the adjusting of the degree of exposure of the camera further comprises:
    identifying a depth of the at least one object of interest in the preview image; and
    determining a range of the aperture value based on the identified depth.

10. The operating method of claim 9, wherein the adjusting of the degree of exposure of the camera further comprises generating a control command for adjusting at least one of the ISO value, the shutter speed, or the aperture value of the camera, based on the determined range of the shutter speed, the determined range of the ISO value, or the determined range of the aperture value.

11. An augmented reality (AR) glass apparatus comprising:
    a camera;
    a motion sensor; and
    at least one processor,
    wherein the at least one processor is configured to:
    obtain a preview image through the camera of the AR glass apparatus,
    track a gaze direction of a user wearing the AR glass apparatus,
    determine at least one object of interest in the preview image based on the tracked gaze direction,
    obtain local motion information indicating a movement of the at least one object of interest by tracking the movement of the at least one object of interest,
    measure a movement of the AR glass apparatus by using the motion sensor,
    obtain global motion information indicating a movement of a background region included in the preview image based on the measured movement of the AR glass apparatus,
    adjust a degree of exposure of the camera based on the local motion information and the global motion information, and
    photograph a front of the AR glass apparatus through the camera having the adjusted degree of exposure.

12. The AR glass apparatus of claim 11, further comprising an illuminance sensor,
    wherein the at least one processor is further configured to:

measure an illuminance around the AR glass apparatus by using the illuminance sensor of the AR glass apparatus and adjust the degree of exposure of the camera based on the measured illuminance.

13. The AR glass apparatus of claim 11, wherein the at least one processor is further configured to determine the at least one object of interest in the preview image based on image analysis with respect to a region corresponding to the tracked gaze direction in the preview image.

14. The AR glass apparatus of claim 11, wherein the at least one processor is further configured to:
track a position change of the at least one object of interest in each frame of the preview image, and
obtain the local motion information based on a result of tracking the position change.

15. The AR glass apparatus of claim 11, wherein the at least one processor is further configured to:
determine the background region included in the captured preview image,
track the movement of the background region based on a result of measuring the movement of the AR glass apparatus, and
obtain the global motion information based on a result of tracking the movement of the background region.

16. The AR glass apparatus of claim 11, wherein the at least one processor is further configured to measure at least one of a position, a direction, a speed, or an acceleration of the AR glass apparatus through the motion sensor.

17. The AR glass apparatus of claim 11, wherein the at least one processor is further configured to adjust the degree of exposure by adjusting at least one of an International Organization for Standardization (ISO) value, a shutter speed, or an aperture value of the camera.

18. The AR glass apparatus of claim 17, wherein the at least one processor is further configured to adjust the degree of exposure by identifying an illuminance of the at least one object of interest in the captured preview image, determining a range of the shutter speed by comparing an illuminance around the AR glass apparatus measured through an illuminance sensor with the identified illuminance of the at least one object of interest, and determining a range of the ISO value based on the determined range of the shutter speed.

19. The AR glass apparatus of claim 18, wherein the at least one processor is further configured to:
identify a depth of the at least one object of interest in the captured preview image, and
determine a range of the aperture value based on the determined depth.

20. A non-transitory computer-readable recording medium having recorded thereon a program for executing operations on a computer, the operations comprising:
obtaining a preview image through a camera of an augmented reality (AR) glass apparatus;
tracking a gaze direction of a user wearing the AR glass apparatus;
determining at least one object of interest in the preview image based on the tracked gaze direction;
obtaining local motion information indicating a movement of the at least one object of interest by tracking the movement of the at least one object of interest;
measuring a movement of the AR glass apparatus;
obtaining global motion information indicating a movement of a background region included in the preview image based on the measured movement of the AR glass apparatus;
adjusting a degree of exposure of the camera based on the local motion information and the global motion information; and
photographing a front of the AR glass apparatus through the camera having the adjusted degree of exposure.

* * * * *